(12) United States Patent
Cambridge et al.

(10) Patent No.: US 11,445,026 B2
(45) Date of Patent: *Sep. 13, 2022

(54) METHODS, SYSTEMS, AND MEDIA FOR INDICATING A SECURITY STATUS OF AN INTERNET OF THINGS DEVICE

(71) Applicant: McAfee, LLC, San Jose, CA (US)

(72) Inventors: Rodney D. Cambridge, Ruslip (GB);
Jonathan D. Dyton, Aylesbury (GB);
Matthew T. Byrne, Staten Island, NY (US)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,782

(22) Filed: Nov. 6, 2020

(65) Prior Publication Data
US 2021/0058465 A1 Feb. 25, 2021

Related U.S. Application Data

(63) Continuation of application No. 16/139,915, filed on Sep. 24, 2018, now Pat. No. 10,834,200.

(51) Int. Cl.
*H04L 29/08* (2006.01)
*H04L 67/125* (2022.01)
(Continued)

(52) U.S. Cl.
CPC .......... *H04L 67/125* (2013.01); *H04L 41/22* (2013.01); *H04L 63/123* (2013.01); *H04N 7/181* (2013.01);
(Continued)

(58) Field of Classification Search
CPC ..... H04L 67/125; H04L 63/123; H04L 41/22; H04L 67/12; H04W 4/029; H04W 8/22;
(Continued)

(56) References Cited

U.S. PATENT DOCUMENTS 10,834,200 B2 * 11/2020 Cambridge ........... H04L 63/123
2004/0174264 A1 9/2004 Reisman et al.
(Continued)

OTHER PUBLICATIONS

International Preliminary Report on Patentability dated Apr. 1, 2021 in International Patent Application No. PCT/US2019/044444, pp. 1-8.
(Continued)

*Primary Examiner* — Kim T Nguyen
(74) *Attorney, Agent, or Firm* — Byrne Poh LLP

(57) ABSTRACT

Methods, systems, and media for indicating a security status of an Internet of Things (IoT) device are provided. In some embodiments, a method for indicating a security status of an IoT device is provided, the method comprising: detecting a field of view comprising an IoT device; tracking a position of the IoT device relative to the field of view; interrogating the IoT device for a status thereof; determining a security status of the IoT device based on the interrogating; selecting a graphical representation of a plurality of graphical representations based on the determined security status of the IoT device; and causing an interface to be presented that displays the graphical representation associated with the position of the IoT device in the field of view.

18 Claims, 8 Drawing Sheets

(51) Int. Cl.
*H04W 4/029* (2018.01)
*H04N 7/18* (2006.01)
*H04L 9/40* (2022.01)
*H04L 41/22* (2022.01)
*H04W 8/22* (2009.01)
*H04W 12/30* (2021.01)
*H04W 12/63* (2021.01)

(52) U.S. Cl.
CPC ............ *H04W 4/029* (2018.02); *H04W 8/22* (2013.01); *H04W 12/30* (2021.01); *H04W 12/63* (2021.01)

(58) Field of Classification Search
CPC ....... H04W 12/1201; H04W 12/00505; H04W 12/00504; H04W 12/1008; H04W 12/00503; H04W 12/0027; H04W 4/70; H04N 7/181
See application file for complete search history.

(56) References Cited

U.S. PATENT DOCUMENTS

| | | |
|---|---|---|
| 2009/0326684 A1 | 12/2009 | Wang et al. |
| 2012/0235791 A1 | 9/2012 | Donlan et al. |
| 2013/0002413 A1 | 1/2013 | Du et al. |
| 2013/0150686 A1 | 6/2013 | Fronterhouse et al. |
| 2014/0197959 A1* | 7/2014 | Tarmey ................. G08B 25/14 340/691.6 |
| 2015/0319554 A1 | 11/2015 | Donald et al. |
| 2017/0134553 A1 | 5/2017 | Bongjeong et al. |
| 2018/0373283 A1* | 12/2018 | Lamb ................. H02J 13/0086 |
| 2019/0089456 A1* | 3/2019 | Kasilya Sudarsan ........................ H04M 1/72412 |
| 2019/0102730 A1 | 4/2019 | Giorgi et al. |

OTHER PUBLICATIONS

International Search Report and Written Opinion dated Nov. 15, 2019 in International Patent Application No. PCT/US2019/044444, pp. 1-11.

Liffreing, I., "How Brands are Using Apple's New AR Capabilities", Digday, Sep. 25, 2017, pp. 1-5.

Notice of Allowance dated Sep. 1, 2020 in U.S. Appl. No. 16/139,915, pp. 1-21.

Office Action dated Jun. 25, 2020 in U.S. Appl. No. 16/139,915, pp. 2-4.

Extended European Search Report dated May 24, 2022 in European Patent Application No. 19865401.4, pp. 1-11.

* cited by examiner

METHODS, SYSTEMS, AND MEDIA FOR INDICATING A SECURITY STATUS OF AN INTERNET OF THINGS DEVICE

CROSS-REFERENCE TO RELATED APPLICATION

This application is a continuation of U.S. patent application Ser. No. 16/139,915, filed Sep. 24, 2018, which is hereby incorporated by reference herein in its entirety.

TECHNICAL FIELD

The disclosed subject matter relates to methods, systems, and media for indicating a security status of an Internet of Things (IoT) device.

BACKGROUND

Internet of Things (IoT) devices have proliferated in recent years. For example, IoT devices include smart thermostats, smart home devices (e.g., an alarm clock, an electric toothbrush, a scale, a VoIP phone, and/or any other suitable home device), smart vending machines, smart exercise machines, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), smart computing devices (e.g., a mobile phone, a printer, a computer, a network router, and/or any other suitable computing device), smart security systems, and/or any other suitable device capable of connecting to a network to transmit and receive data. As IoT devices become more prolific, users face a problem of determining whether connection and interaction with these IoT devices are safe.

Accordingly, it is desirable to provide new methods, systems, and media for indicating a security status of an IoT device.

SUMMARY

Methods, systems, and media for indicating a security status of an Internet of Things (IoT) device are provided. In accordance with some embodiments of the disclosed subject matter, a method for indicating a security status of an IoT device is provided, the method comprising: detecting a field of view comprising an IoT device; tracking a position of the IoT device relative to the field of view; interrogating the IoT device for a status thereof; determining a security status of the IoT device based on the interrogating; selecting a graphical representation of a plurality of graphical representations based on the determined security status of the IoT device; and causing an interface to be presented that displays the graphical representation associated with the position of the IoT device in the field of view.

In some embodiments, detecting a field of view comprises capturing video of the field of view, and the interface displays the video and the graphical representation superimposed over the position of the IoT device relative to the field of view.

In some embodiments, interrogating the IoT device comprises: transmitting, to the IoT device, a request for the status thereof; and receiving, from the IoT device, information indicating that the IoT device is in a secure state or information indicating that the IoT device is in an insecure state.

In some embodiments, the information indicating that the IoT device is in the secure state comprises information indicating that a cryptographic hash of code of the IoT device matches a reference, and the information indicating that the IoT device is in the insecure state comprises information indicating that the cryptographic hash of the code of the IoT device does not match the reference.

In some embodiments, the plurality of graphical representations comprises a first graphical representation indicating that the IoT device is in a secure state, a second graphical representation indicating that the IoT device is in an insecure state, and a third graphical representation indicating an inability to determine the security status of the IoT device.

In some embodiments, the method further comprises: continuously detecting the field of view; continuously tracking the position of the IoT device in the field of view; and continuously updating the interface that displays the graphical representation associated with the position of the IoT device relative to the field of view.

In some embodiments, the method further comprises: receiving a user input on the interface corresponding to the graphical representation; and in response to receiving the user input, performing at least one action associated with the IoT device.

In accordance with some embodiments of the disclosed subject matter, a system for indicating a security status of an IoT device is provided, the system comprising: a hardware processor that is configured to: detect a field of view comprising an IoT device; track a position of the IoT device relative to the field of view; interrogate the IoT device for a status thereof; determine a security status of the IoT device based on the interrogating; select a graphical representation of a plurality of graphical representations based on the determined security status of the IoT device; and cause an interface to be presented that displays the graphical representation associated with the position of the IoT device in the field of view.

In accordance with some embodiments of the disclosed subject matter, non-transitory computer-readable medium containing computer-executable instructions that, when executed by a processor, cause the processor to perform a method for indicating a security status of an IoT device, the method comprising: detecting a field of view comprising an IoT device; tracking a position of the IoT device relative to the field of view; interrogating the IoT device for a status thereof; determining a security status of the IoT device based on the interrogating; selecting a graphical representation of a plurality of graphical representations based on the determined security status of the IoT device; and causing an interface to be presented that displays the graphical representation associated with the position of the IoT device in the field of view.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
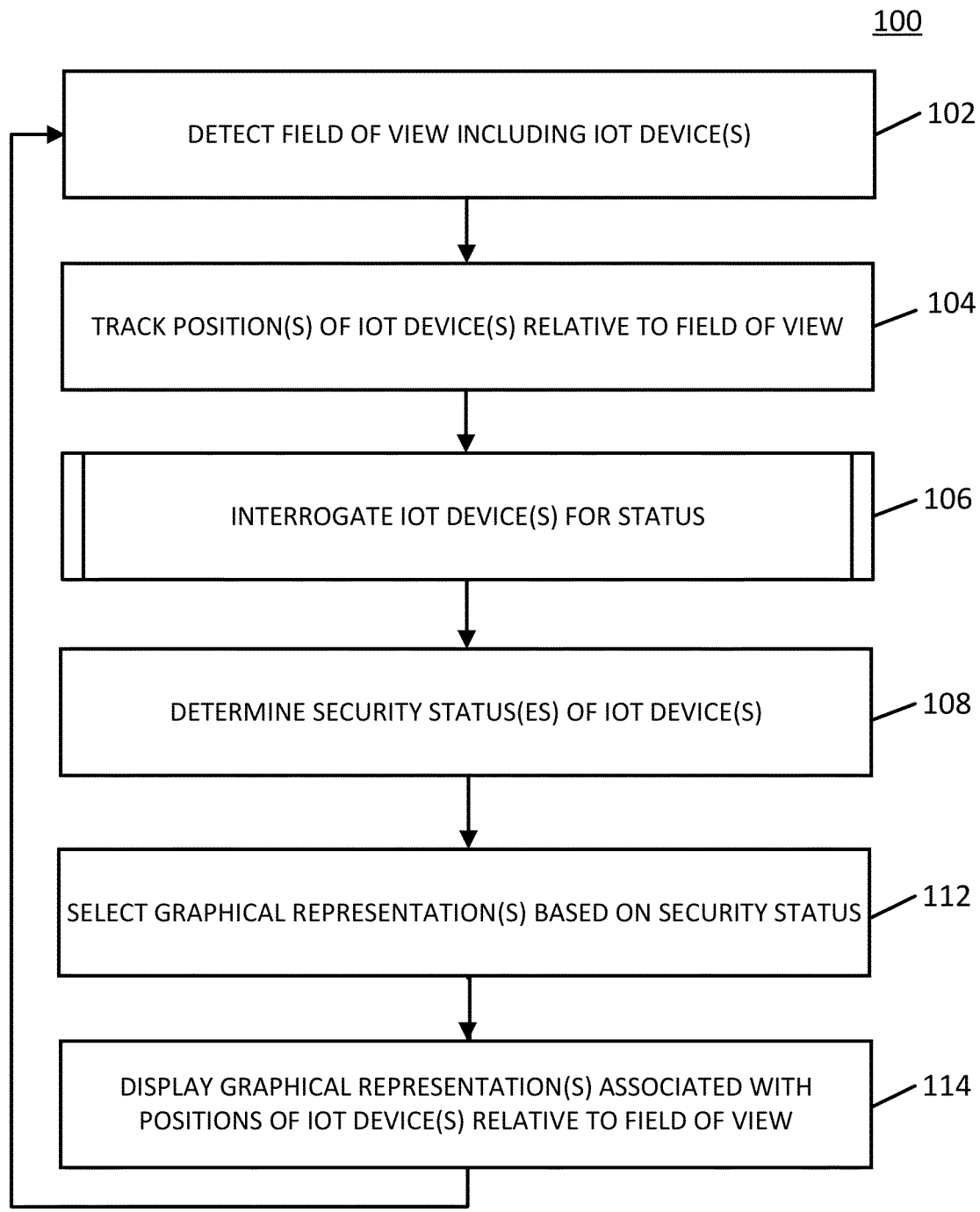
FIG. 1 shows an example of a process for indicating a security status of an Internet of Things (IoT) device in accordance with some embodiments of the disclosed subject matter.

In accordance with various embodiments, mechanisms (which can include methods, systems, and media) for indicating a security status of an Internet of Things (IoT) device are provided. In some embodiments, the mechanisms described herein can provide an augmented reality experience to show security status of an IoT device near a user.

In some embodiments, the mechanisms described herein can determine that a user device, such as a smart phone, smart glasses, a tablet computer, an augmented reality headset, a heads-up display, and/or any other suitable user device, is showing a field of view including one or more IoT devices, such as a smart thermostat, a smart home device, a smart vending machine, a smart exercise machine, a smart appliance, a smart media system, a smart computing device, a smart security system, and/or any other suitable IoT device. The mechanisms described herein can then determine a security status for each IoT device, select a graphical representation corresponding to each security status, and cause an interface to be presented that displays the graphical representation(s) shown on top of, adjacent to, behind, or otherwise associated with the IoT device(s).

For example, in some embodiments, the mechanisms described herein can capture real-time images and/or video of a field of view, track position(s) of one or more IoT devices in the field of view, and indicate the status of the one or more IoT devices using icons overlaid on the field of view.

In some embodiments, the mechanisms described herein can continuously capture images and/or video of a field of view, track position(s) of IoT device(s) relative to the field of view, and update an interface to display selected graphical representation(s) associated with the IoT device(s) in the field of view.

In some embodiments, the mechanisms described herein can participate in an interrogation for status. For example, in some embodiments, the mechanisms described herein can perform a handshaking procedure and receive information indicating a state of an IoT device, such as information indicating that the IoT device is in a secure state or information indicating that the IoT device is in an insecure state. In some embodiments, the mechanisms described herein can instruct an IoT device to perform a self-check procedure. For example, in some embodiments, the mechanisms described herein can cause an IoT device to create a cryptographic hash of code, compare the hash to a known reference, and determine a state of the IoT device based on the comparison.

In some embodiments, the mechanisms described herein can facilitate user interaction with a graphical representation of a security status of an IoT device. For example, in some embodiments, the mechanisms described herein can receive a user input corresponding to a graphical representation of a security status of a given IoT device and perform one or more actions associated with the given IoT device.

In some embodiments, the mechanisms described herein can be used to improve computer security by allowing a user to quickly and easily identify nearby IoT devices that are secure and up-to-date or that are at risk. For example, the mechanisms described herein can indicate a security status of an IoT device using an easy-to-understand graphical representation to ensure users that IoT devices, whether at home or away from home, are up-to-date and are not infected by malware, and/or to warn users that certain IoT devices are at risk in some embodiments. As another example, in some embodiments, business users (e.g., IT technicians, reception/security staff, and/or any other suitable business user) can use the mechanisms described herein to quickly and easily identify insecure devices on a business' premises.

Additionally, the mechanisms described herein can allow users to take appropriate action based on a security status of an IoT device. For example, in some embodiments, the mechanisms described herein can allow a user in a public space to avoid using an IoT device identified as being at risk and/or notify an owner or administrator of the IoT device that the IoT device is at risk. As another example, in some embodiments, the mechanisms described herein can allow a user to take necessary steps to quarantine and/or update IoT devices determined to be at risk.

Turning to FIG. 1, an example 100 of a process for indicating a security status of an IoT device in accordance with some embodiments of the disclosed subject matter is shown. As illustrated, blocks of process 100 can be executed by one or more suitable computing devices, such as one or more servers, one or more user devices, and/or any other suitable computing device(s), as shown in and described below in connection with FIGS. 4, 6, and 7.

At 102, a computing device can detect a field of view of its surroundings, which can include one or more IoT devices. In some embodiments, the field of view can correspond to the desired visual field to be inspected by a user. Note that, in some embodiments, an IoT device can include smart thermostats, smart home devices (e.g., an alarm clock, an electric toothbrush, a scale, a VoIP phone, and/or any other suitable home device), smart vending machines, smart exercise machines, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), smart computing devices (e.g., a mobile phone, a printer, a computer, a network router, and/or any other suitable computing device), smart security systems, and/or any other suitable device capable of connecting to a network to transmit and receive data.

In some embodiments, a computing device can capture real-time images and/or video of its surroundings in any suitable manner. For example, in some embodiments, a computing device can capture the images and/or video using one or more cameras (e.g., a front-facing camera, a rear-facing camera, a panoramic camera, an omnidirectional camera, a stereo camera, and/or any other suitable camera), one or more infrared sensors, and/or any other suitable sensor(s).

In some embodiments, a computing device can recognize one or more objects (e.g., IoT devices) within the field of view of a captured real-time image and/or a frame of captured video. For example, in some embodiments, a computing device can recognize an IoT device in the field of view of a captured image and/or frame by analyzing the image or frame and matching spatial information within the image or frame with predetermined spatial information associated with the IoT device. In some embodiments, a computing device can recognize an IoT device in the captured images and/or video in any suitable manner.

In some embodiments, a computing device can include reference object information that includes one or more reference objects. In some embodiments, each reference object can include spatial information associated with a corresponding IoT device that can be used to recognize the IoT device. In some embodiments, reference object information and/or a reference object can include any other suitable information. Note that, in some embodiments, reference object information can be stored locally on the computing device and/or be transmitted from one or more remote devices, such as one or more servers, one or more user devices, one or more other IoT devices, and/or any other suitable computing device(s).

Additionally or alternatively, in some embodiments, a computing device can detect an IoT device in any other suitable manner. For example, in some embodiments, a computing device can listen for and detect one or more IoT devices transmitting status over a communication network, such as via BLUETOOTH LE and/or any other suitable communication mechanism. As another example, in some embodiments, a computing device can detect an IoT device using a unique identifier, such as an RFID device incorporated in an IoT device and/or any other suitable unique identifier.

In some embodiments, a computing device can identify IoT devices via any suitable challenge-response mechanism. For example, in some embodiments, a detected IoT device could include a device ID, a device name, a device status, and/or any other suitable information as a response. Additionally or alternatively, in some embodiments, a computing device and an IoT device can use public-key cryptography to provide authentication.

Additionally or alternatively, in some embodiments, a computing device can detect motion information of the computing device using one or more sensors, such as a global positioning satellite (GPS) system, a compass, an accelerometer, a gyroscope, and/or any other suitable sensor. In some embodiments, the motion information can include a position of the computing device, an orientation of the computing device, motion of the computing device, and/or any other suitable information of the computing device.

At 104, a computing device can track position(s) of the one or more IoT devices relative to the field of view. For example, in some embodiments, a computing device can determine position information (e.g., a position, an orientation, a size, and/or any other suitable information) for each of the recognized IoT devices. In some embodiments, a computing device can determine the position information using the motion information and/or any other suitable information. In some embodiments, the position information and/or the motion information can be stored locally on the computing device or remotely.

Note that, in some embodiments, the position information for each IoT device and/or the motion information of the computing device can be mapped to a coordinate system, such as a coordinate system relative to the computing device as an origin, a coordinate system relative to the field of view of the computing device, an absolute coordinate system relative to the computing device and the IoT device(s) around a common origin, and/or any other suitable coordinate system. In some embodiments, the coordinate system can correspond to the real space and/or a virtual space.

Additionally or alternatively, in some embodiments, a computing device can receive the position information for each IoT device and/or the motion information of the computing device from one or more remote sources, such as one or more servers, one or more user devices, one or more other IoT devices, and/or any other suitable computing device(s). In some embodiments, a computing device can use the received position information for each IoT device and the motion information (e.g., position, orientation, etc.) to determine position(s) of one or more IoT device relative to the computing device. For example, in some embodiments, a computing device can use the received position information and the motion information to map the computing device and IoT device(s) to a coordinate system (e.g., a coordinate system relative to the device as an origin, a coordinate system relative to the field of view of the device, an absolute coordinate system relative to the device and the IoT device(s) around a common origin, and/or any other suitable coordinate system). The computing device can then determine one or more IoT devices that are within a field of view of the computing device, and corresponding position(s) of the IoT device(s) relative to the field of view of the computing device, based on the position and orientation of the computing device within the coordinate system. In some embodiments, the computing device can determine the IoT device(s) that are within the field of view of the computing device and their position information without capturing or analyzing real-time images and/or video.

At 106, a computing device can interrogate a detected IoT device for its status in any suitable manner, such as in the manner shown in and described below in connection with FIG. 2.

Figure 2:
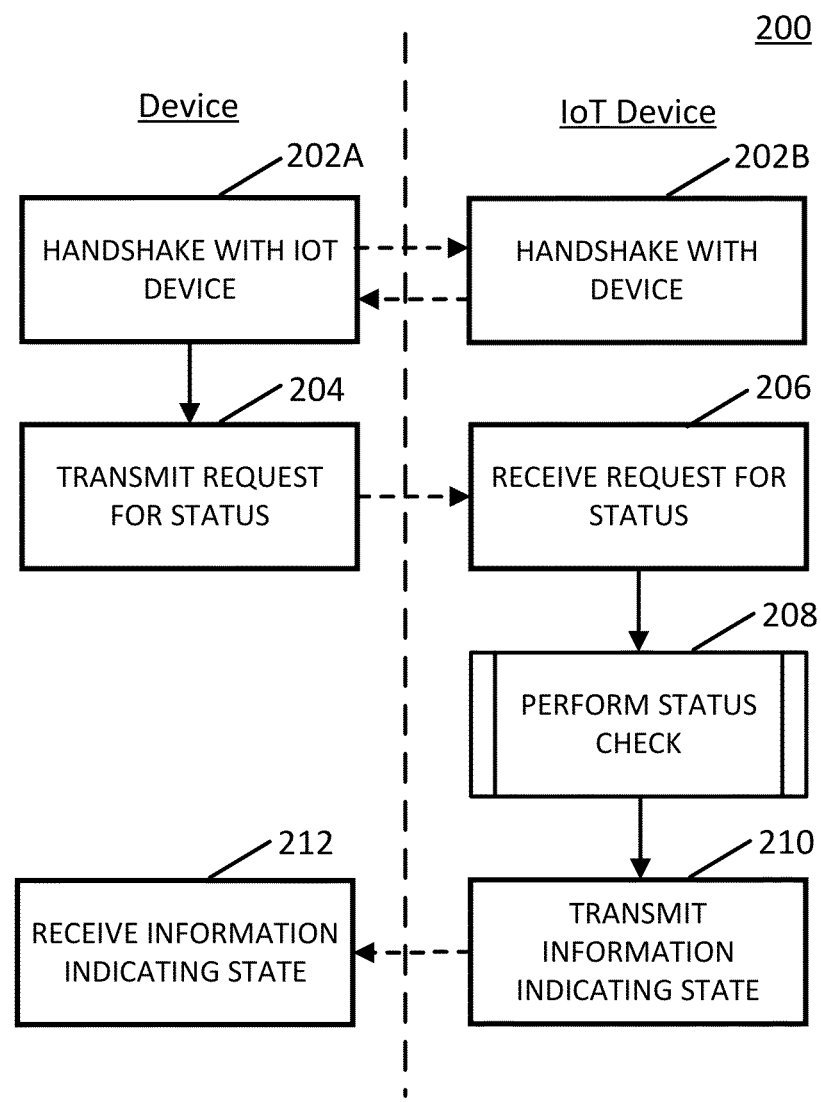
FIG. 2 shows an example of an information flow diagram for interrogating an IoT device for status in accordance with some embodiments of the disclosed subject matter.

Turning to FIG. 2, an example 200 of an information flow diagram for interrogating an IoT device for status in accordance with some embodiments of the disclosed subject matter is shown. As illustrated, blocks of information flow diagram 200 can be executed by one or more suitable computing devices, such as one or more servers, one or more user devices, one or more IoT devices, and/or any other suitable computing device(s), as shown in and described below in connection with FIGS. 4, 6, and 7.

At 202A and 202B, a computing device and a detected IoT device can perform a handshake procedure in any suitable manner. For example, in some embodiments, a computing device can communicate with a detected IoT device via BLUETOOTH LE and/or any other suitable communication mechanism.

At 204, a computing device can transmit a request to a detected IoT device for its status. In some embodiments, the request can include any suitable content and/or data for requesting a status from a detected IoT device.

At 206, a detected IoT device can receive a request for status.

At 208, a detected IoT device can perform a status check in response to receiving a request for its status. In some embodiments, an IoT device can perform a status check in any suitable manner, such as in the manners shown in and described below in connection with FIGS. 3A and 3B.

Figure 3A:
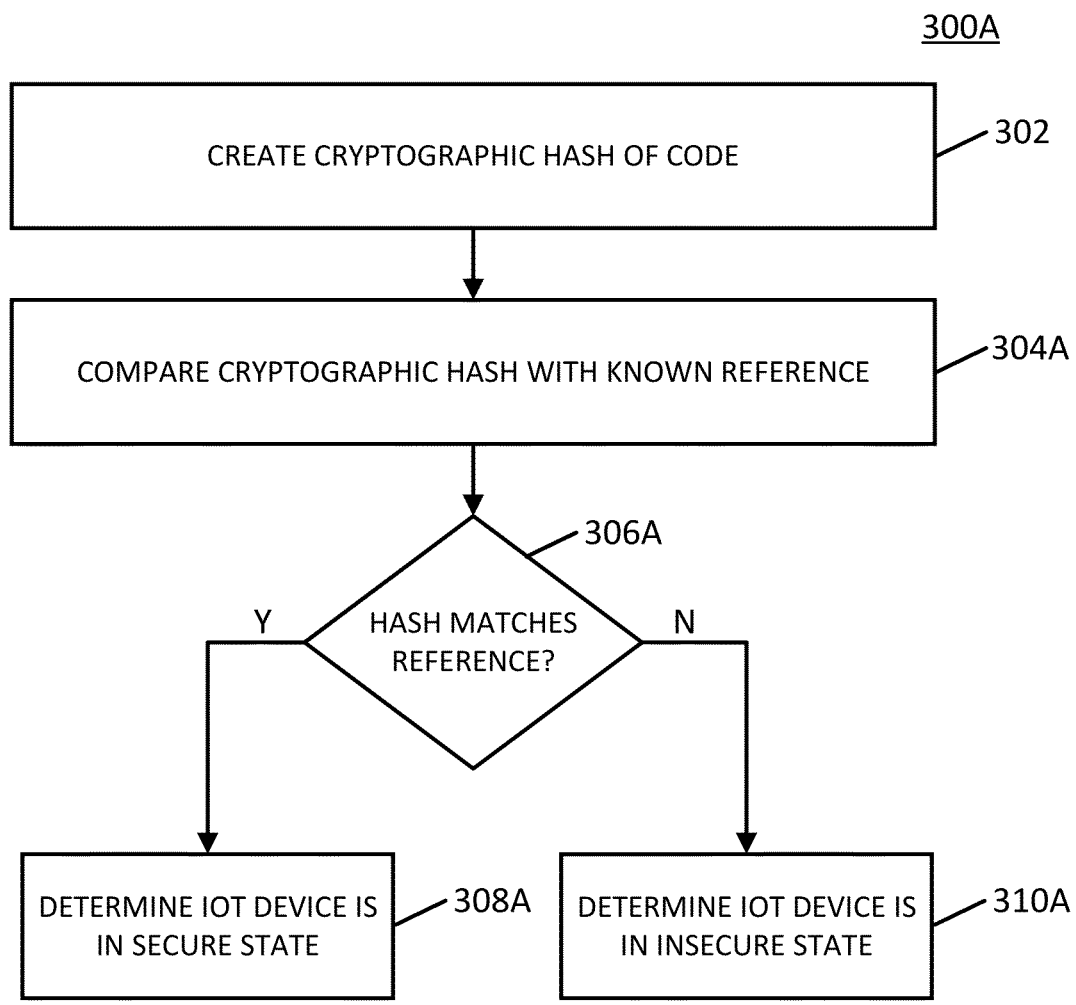
FIG. 3A shows an example of a process for performing a status self-check in accordance with some embodiments of the disclosed subject matter.

Turning to FIG. 3A, an example 300A of a process for performing a status self-check in accordance with some embodiments of the disclosed subject matter is shown. As illustrated, blocks of process 300A can be executed by one or more IoT devices as shown in and described below in connection with FIGS. 4, 6, and 7.

At 302, an IoT device can create a cryptographic hash of its code in any suitable manner.

At 304A, an IoT device can compare a cryptographic hash of its code with one or more known references in any suitable manner. For example, in some embodiments, the known reference(s) can be a hash of an up-to-date version of code for the IoT device, a hash of a specific version of code for the IoT device, and/or any other suitable reference. Note that, in some embodiments, the known reference can be stored locally on the IoT device and/or be transmitted from one or more remote devices, such as one or more servers, one or more user devices, one or more other IoT devices, and/or any other suitable computing device(s).

At 306A, an IoT device can determine whether a cryptographic hash of its code matches a known reference. If the hash matches a known reference, then, at 308A, an IoT device can determine that its code has not been tampered with and/or is up-to-date and that it is in a secure state. However, if the hash does not match a known reference, then at 310A, an IoT device can determine that its code has been changed and/or is not up-to-date and that it is in an insecure state.

Figure 3B:
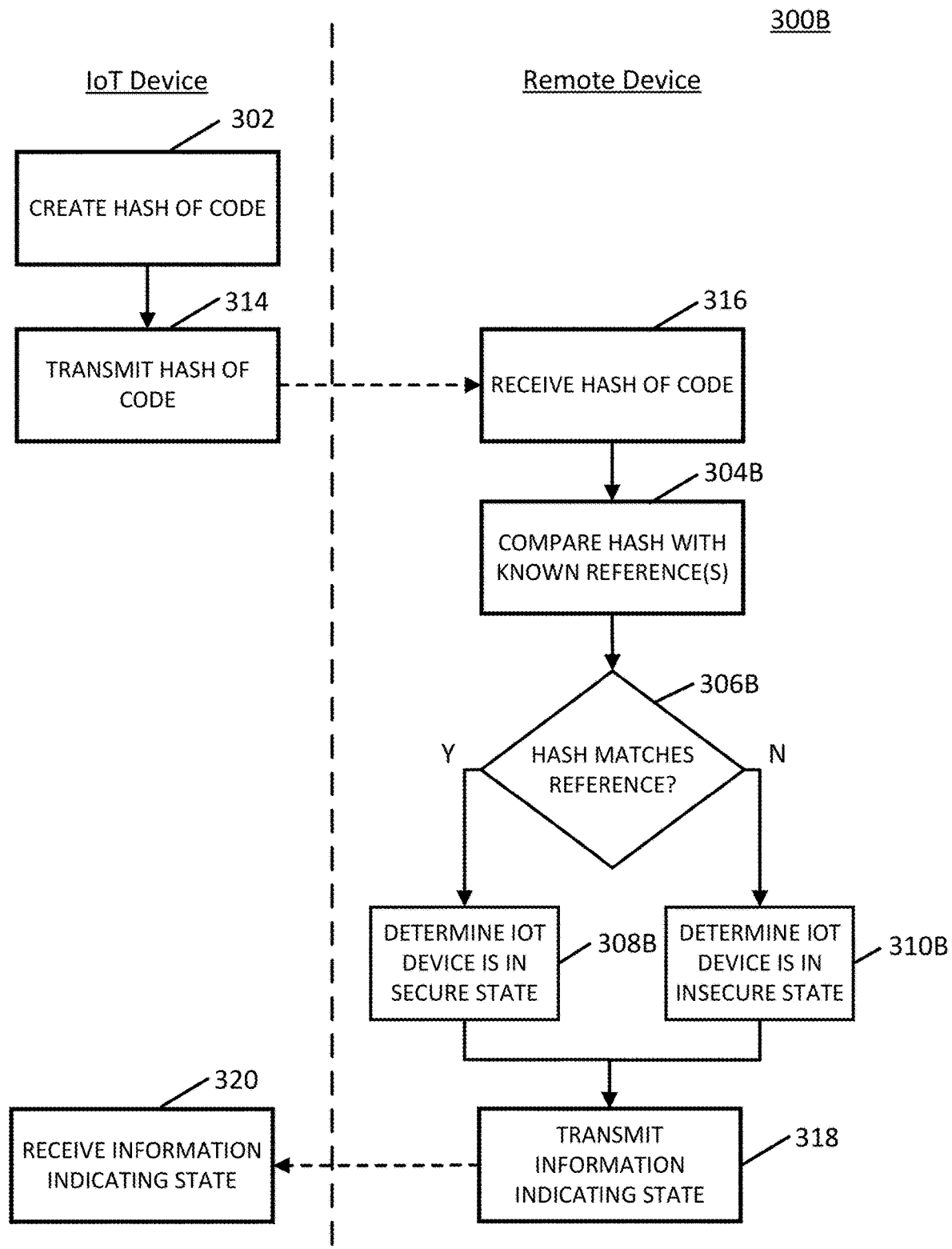
FIG. 3B shows an example of a process for performing a status check in accordance with some embodiments of the disclosed subject matter.

Turning to FIG. 3B, an example 300B of an information flow diagram for performing a status check in accordance with some embodiments of the disclosed subject matter is shown. As illustrated, blocks of process 300B can be executed by one or more computing devices, such as one or more servers, one or more user devices, one or more IoT devices, and/or any other suitable computing device(s), as shown in and described below in connection with FIGS. 4, 6, and 7.

At 302, an IoT device can create a cryptographic hash of its code in any suitable manner.

At 314, an IoT device can transmit a cryptographic hash of its code to one or more remote devices, such as such as one or more servers, one or more user devices, one or more other IoT devices, and/or any other suitable computing device(s). Note that, in some embodiments, an IoT device can transmit its code to the remote device(s) which can then create the hash of the code of the IoT device.

At 316, a remote device can receive the cryptographic hash of code of the IoT device.

At 304B, a remote device can compare a cryptographic hash of code of the IoT device with one or more known references in any suitable manner. For example, in some embodiments, the known reference(s) can be a hash of an up-to-date version of code for the IoT device, a hash of a specific version of code for the IoT device, and/or any other suitable reference. Note that, in some embodiments, the known reference can be stored locally on the remote device and/or be transmitted from one or more other remote devices.

At 306B, a remote device can determine whether a cryptographic hash of code of an IoT device matches a known reference. If the hash matches a known reference, then, at 308B, a remote device can determine that the code of the IoT device has not been tampered with and/or is up-to-date and that the IoT device is in a secure state. However, if the hash does not match a known reference, then at 310B, the remote device can determine that the code has been changed and/or is not up-to-date and that the IoT device is in an insecure state.

At 318, a remote device can transmit information indicating a state of an IoT device to the IoT device. For example, in some embodiments, the information indicating the state of an IoT device can include information indicating that the IoT device is in a secure state or information indicating that the IoT device is in an insecure state. Additionally or alternatively, in some embodiments, the information indicating the state of an IoT device can include information indicating that a cryptographic hash of code of the IoT device matches a known reference or information indicating that the hash of code does not match the known reference. In some embodiments, the remote device can transmit any other suitable information.

Note that, in some embodiments, a remote device can transmit the information indicate the state of an IoT device and/or any other suitable information to one or more suitable computing devices, such as one or more servers, one or more user devices, one or more IoT devices, and/or any other suitable computing device(s). For example, in some embodiments, a remote device can transmit information indicating the state of an IoT device to a device that requested the IoT device for status.

At 320, an IoT device can receive information indicating a state of the IoT device from a remote device.

Turning back to FIG. 2, at 210, an IoT device can transmit information indicating a state of the IoT device as determined by a status check to a computing device. For example, in some embodiments, an IoT device can transmit information indicating that the IoT device is in a secure state or information indicating that the IoT device is in an insecure state. Additionally or alternatively, in some embodiments, the IoT device can transmit information indicating that a cryptographic hash of its code matches a known reference or information indicating that the hash of its code does not match the known reference. In some embodiments, an IoT device can transmit any other suitable information to a computing device. For example, in some embodiments, an IoT device can transmit device information, such as a device ID, a device name, a device status, a device firmware version, a default username and/or password for the IoT device, a network with which the IoT device is connected, and/or any other suitable device information.

At 212, a computing device can receive information indicating a state of an IoT device. For example, in some embodiments, a computing device can receive information indicating that an IoT device is in a secure state or information indicating that the IoT device is in an insecure state. Additionally or alternatively, in some embodiments, the computing device can receive information indicating that a cryptographic hash of the IoT device's code matches a known reference or information indicating that the hash of the IoT device's code does not match the known reference.

Turning back to FIG. 1, at 108, a computing device can determine a security status of an IoT device in any suitable manner. In some embodiments, a computing device can determine a security status of an IoT based on the interrogation performed at 106. For example, in some embodiments, a computing device can determine that an IoT device is in a secure state in response to receiving information indicating that the IoT device is in a secure state, information indicating that the hash of the IoT device's code matches a known reference, and/or any other suitable information. As another example, in some embodiments, a computing device can determine that an IoT device is in an insecure state in response to receiving information indicating that the IoT device is in an insecure state, information indicating that the hash of the IoT device's code does not match a known reference, and/or any other suitable information. As yet another example, in some embodiments, a computing device can determine an inability to determine a security status of the IoT device, such as by failing to receive a response from the IoT device regarding its status and/or in any other suitable manner. Additionally or alternatively, in some embodiments, a computing device can determine a security status of an IoT device based on information received from one or more other devices, such as one or more user devices, one or more servers, one or more other IoT devices, and/or any other suitable computing device(s).

At 112, for each IoT device in a field of view, a computing device can select a graphical representation corresponding to a security status of the IoT device from a plurality of graphical representations. For example, in some embodiments, the graphical representations can include a graphical representation for a secure state, a graphical representation for an insecure state, a graphical representation corresponding to an inability to determine a security status of an IoT device, and/or a graphical representation for any other suitable security status. In some embodiments, the graphical representations can include one or more shapes, one or more symbols, one or more text characters, one or more icons, one or more colors, and/or any other suitable graphical representation(s). For example, in some embodiments, the graphical representations can include a green check mark for a secure state, a red stop sign for an insecure state, and/or a question mark for an inability to determine a security status of an IoT device.

At 114, a computing device can cause an interface to be presented that displays the selected graphical representation(s) associated with position(s) of the IoT device(s) relative to the field of view. For example, in some embodiments, the selected graphical representations can be shown on top of (i.e., superimposed over), adjacent to, behind (i.e., integrated with), or otherwise associated with the tracked position(s) of the IoT device(s) relative to the field of view. In some embodiments, the computing device can cause the interface to display any other suitable content and/or information.

In some embodiments, a computing device can use the position information of the IoT device(s) and/or the motion information of the computing device to determine an appropriate location on the interface to display the graphical representation in a manner that associates the graphical representation with the IoT device relative to the field of view. For example, in some embodiments, a computing device can map the position information to a coordinate system, such as a coordinate system relative to the field of view and/or any other suitable system, which can then be further mapped to another coordinate system corresponding to the interface such that graphical element(s) shown on the interface are suitably associated with objects relative to the field of view.

In some embodiments, a computing device can render each graphical representation of security status and can cause the interface to display the graphical element(s) associated with the IoT device(s) relative to the field of view. For example, in some embodiments, the interface may include a transparent or semi-transparent display to allow a user to show a real scene of one or more IoT devices in the field of view while displaying the graphical representation(s) for the IoT device(s) associated with positions of the IoT device(s) relative to the field of view. In some embodiments, the computing device can additionally render a captured real-time image and/or a frame of captured video and display a composite image including the captured image and/or frame and the graphical element(s) associated with the IoT device(s) relative to the field of view.

Note that, in some embodiments, the position(s) and the number of IoT devices in the field of view can vary over time as IoT devices move and/or as the device moves. For example, in some embodiments, the number of IoT devices in the field of view can increase over time as more IoT devices come into view of the computing device. As another example, in some embodiments, the number of IoT devices in the field of view can decrease over time as IoT devices become out of view of the computing device. Accordingly, in some embodiments, the device can iteratively perform one or more blocks of process 100 to continuously detect a field of view, track position(s) of IoT device(s) in the field of view, and/or update the interface to display appropriate graphical representation(s) associated with corresponding position(s) of IoT device(s) relative to the field of view over time.

Figure 4:
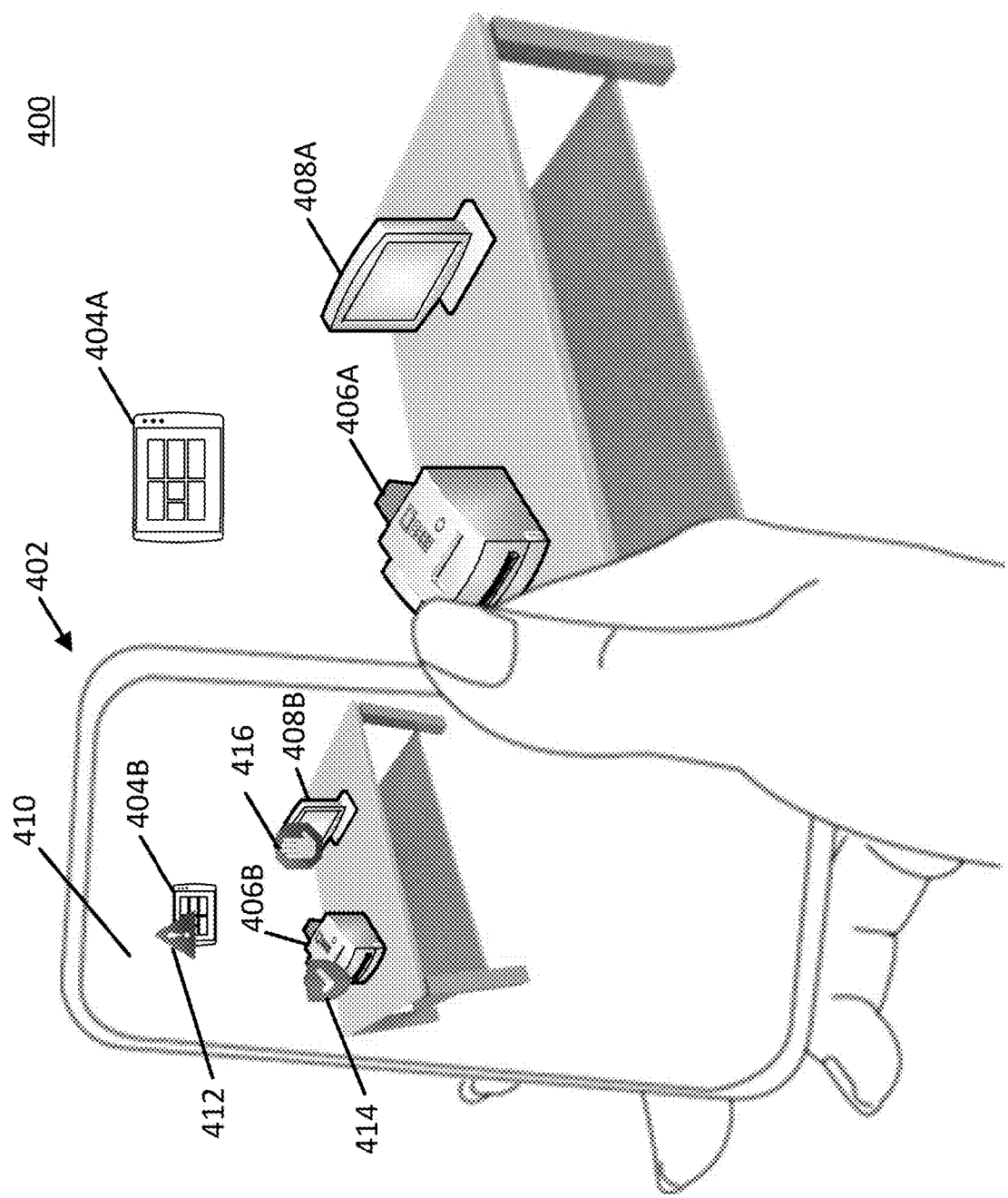
FIG. 4 shows an example of a view of an illustrative system suitable for indicating a security status of an IoT device in accordance with some embodiments of the disclosed subject matter.

Turning to FIG. 4, an example 400 of a view of an illustrative system suitable for indicating a security status of an IoT device in accordance with some embodiments of the disclosed subject matter is shown. As illustrated, view 400 can include a user device 402, IoT device 404A, IoT device 406A, and/or IoT device 408A.

In some embodiments, after detecting the field of view, tracking positions of IoT device 404A, IoT device 406A, and/or IoT device 408A, and determining their respective security statuses, user device 402 can cause interface 410 to be presented, such as in a manner shown in and described above in connection with FIG. 1. In some embodiments, interface 410 can display the captured image including IoT device 404B, IoT device 406B, and/or IoT device 408B corresponding to IoT device 404A, IoT device 406A, and/or IoT device 408A, respectively.

Additionally, in some embodiments, interface 410 can display graphical representation 412, graphical representation 414, and/or graphical representation 416 associated with (i.e., superimposed over) a position of each of IoT device 404B, IoT device 406B, and/or IoT device 408B, respectively, relative to the field of view. In some embodiments, graphical representation 412 can include an exclamation mark in a red triangle indicating an inability to determine a security status of IoT device 404A. In some embodiments, graphical representation 414 can include a check mark in a green shield indicating that IoT device 406A is in a secure state. In some embodiments, graphical representation 416 can include a red stop sign indicating that IoT device 408A is in an insecure state. Note that, in some embodiments, graphical representation 412, graphical representation 414, and graphical representation 416 can be selected corresponding to determined security statuses of IoT device 404A, IoT device 406A, and/or IoT device 408A, such as in a manner shown in and described above in connection with FIG. 1.

Although three IoT devices 404A, 406A, and 408A are shown in FIG. 4 to avoid over-complicating the figure, any suitable number of IoT devices, and/or any suitable types of IoT devices, can be used in some embodiments. Similarly, although three IoT devices 404B, 406B, and 408B are included in the field of view, any suitable number of IoT devices and a corresponding number of graphical representations can be included in the field of view and/or displayed on interface 410 in some embodiments.

In some embodiments, a user can interact with any one of graphical representation 412, graphical representation 414, and/or graphical representation 416 on interface 410. For example, in some embodiments, a user can provide an input corresponding to a graphical representation 416, such as by providing a tactile input on a location of interface 510 corresponding to graphical representation 416 and/or any other suitable input, in order to perform one or more actions associated with IoT device 408A.

Figure 5:
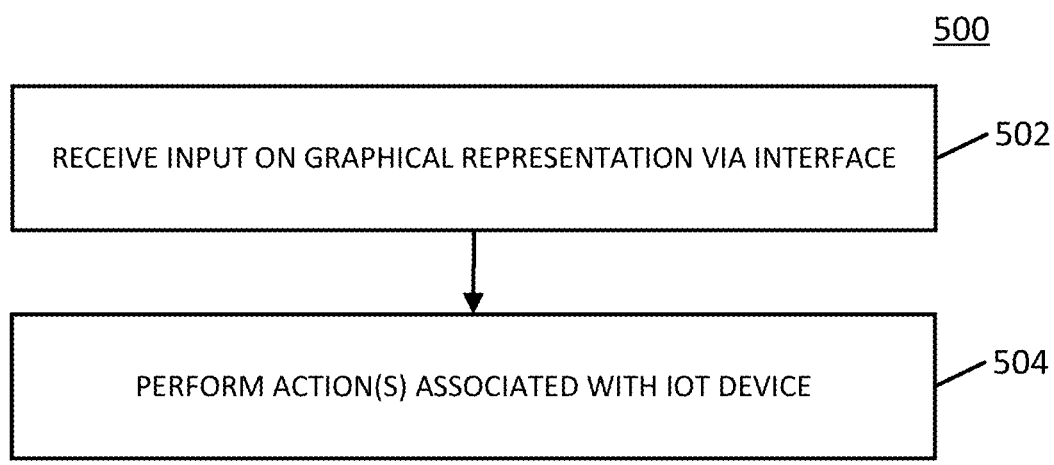
FIG. 5 shows an example of a process for facilitating user interaction with a graphical representation of a security status of an IoT device in accordance with some embodiments of the disclosed subject matter.

Turning to FIG. 5, an example 500 of a process for facilitating user interaction with a graphical representation of a security status of an IoT device in accordance with some embodiments of the disclosed subject matter is shown. As illustrated, blocks of process 500 can be executed by one or more suitable computing devices, such as one or more servers, one or more user devices, and/or any other suitable computing device(s), as shown in and described below in connection with FIGS. 4, 6, and 7.

At 502, a computing device can receive a user input via the interface corresponding to a graphical representation of a security status for a given IoT device. For example, in some embodiments, a computing device can receive a tactile input and/or detected gesture on a location of the interface corresponding to the graphical representation and/or any other suitable user input.

At 504, a computing device can perform one or more actions associated with the given IoT device in response to receiving the user input. For example, in some embodiments, a computing device can cause an aspect of the IoT device (e.g., firmware, software, security protocols, passwords, and/or any other suitable code of the given IoT device) to be updated, such as by transmitting one or more signals to the given IoT device, to one or more other IoT devices, and/or to any other suitable computing device(s) to cause the aspect of the given IoT device to be updated. As another example, in some embodiments, a computing device can cause the IoT device to reboot, such as by transmitting one or more signals to the given IoT device, to one or more other IoT devices, and/or to any other suitable computing device(s) to cause the given IoT device to reboot. As yet another example, in some embodiments, a computing device can cause the given IoT device to be disconnected from a network, such as by transmitting one or more signals to the given IoT device, to one or more other IoT devices, and/or to any other suitable computing device(s) to cause the given IoT device to disconnect itself from a network and/or to be disconnected from a network. As yet another example, in some embodiments, a computing device can transmit information indicating the security status of the given IoT device and/or any other suitable information to an administrator of the given IoT device, to one or more other IoT devices, and/or to any other suitable computing device(s) and/or entities (e.g., a user of the given IoT device, an owner of the given IoT device, a manufacturer of the given IoT device, a security service managing the given IoT device, and/or any other suitable entity). As yet another example, in some embodiments, a computing device can cause the given IoT device and/or cause one or more other IoT devices to indicate the security status of the given IoT device, such as by transmitting one or more signals to cause the given IoT device and/or one or more other IoT devices to provide one or more visual and/or audible alerts (e.g., light color, light pattern, sound, tone, visual message, audible message, and/or any other suitable alert) of the security status of the given IoT device. Note that, in some embodiments, a computing device can take any other suitable action(s) in response to receiving user input on the interface.

Additionally or alternatively, in some embodiments, a computing device can display information related to the given IoT device in response to receiving the user input. For example, in some embodiments, a computing device can display a menu via the interface providing, for selection by a user, one or more actions to be performed in association with the given IoT device. As another example, in some embodiments, a computing device can display device information associated with the given IoT device, such as a device ID, a device name, a device status, a device firmware version, a default username and/or password for the IoT device, a network with which the IoT device is connected, and/or any other suitable device information. In some embodiments, a computing device can display any other suitable information. In some embodiments, the menu, device information, and/or other suitable information can be displayed associated with a position of the given IoT device relative to the field of view.

Figure 6:
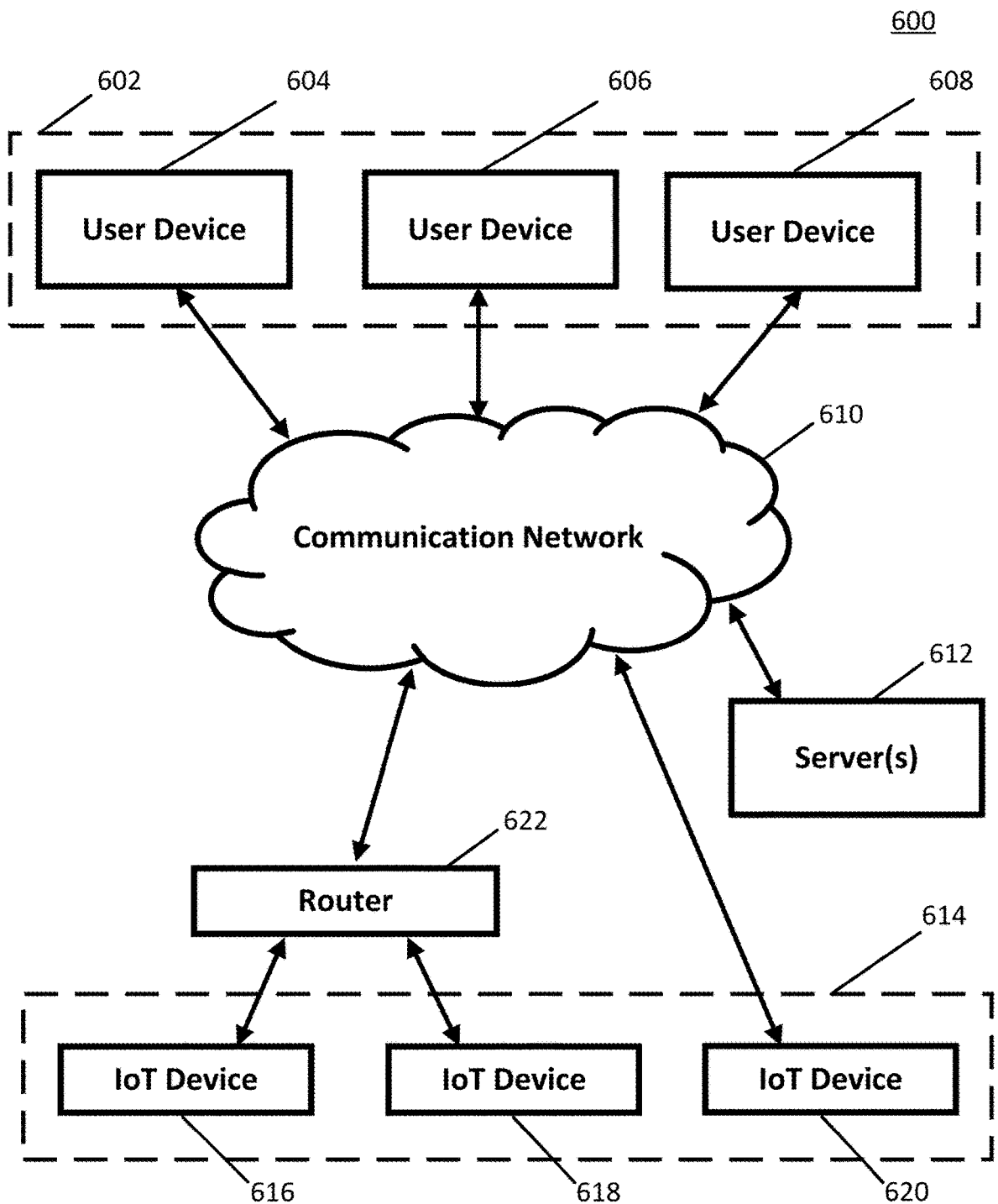
FIG. 6 shows an example of a schematic diagram of an illustrative system suitable for indicating a security status of an IoT device in accordance with some embodiments of the disclosed subject matter.
Figure 7:
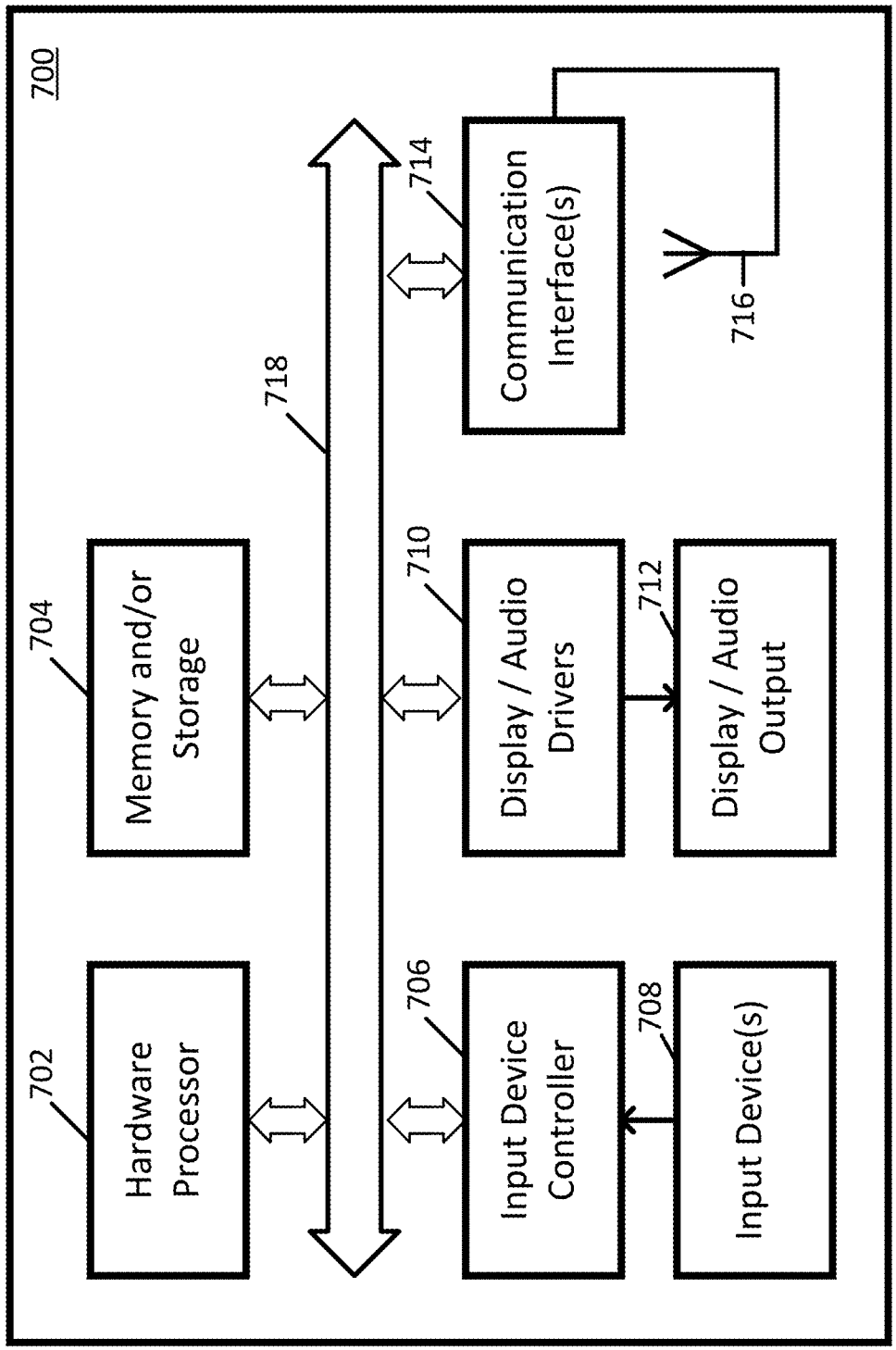
FIG. 7 shows a detailed example of hardware that can be used in a server, a user device, and/or an IoT device of FIG. 6 in accordance with some embodiments of the disclosed subject matter.

Turning to FIG. 6, an example 600 of hardware for indicating a security status of an IoT device that can be used in accordance with some embodiments of the disclosed subject matter is shown. As illustrated, hardware 600 can include one or more user devices 602, such as user device 604, user device 606, and/or user device 608, a communication network 610, a server(s) 612, one or more IoT devices 614, such as IoT device 616, IoT device 618, and IoT device 620, and/or a router 622. Note that, in some embodiments, router 622 is one of the one or more IoT devices 614.

User device(s) 602 can include any suitable computing device(s) for indicating a security status of an IoT device. For example, in some embodiments, user device(s) 602 can include a mobile phone, a smartphone, a tablet computer, a wearable computer, a personal computer, a laptop computer, and/or any other suitable computing device(s). In some embodiments, user device(s) 602 can perform any suitable function(s), such as detecting a field of view, capturing images and/or video of a field of view, detecting an IoT device, detecting and/or receiving motion information, recognizing an IoT device in a captured image and/or frame of video, tracking position(s) of an IoT device in a field of views, determining and/or receiving position information, interrogating an IoT device for status, performing a status check of an IoT device, determining a security status of an IoT device, selecting a graphical representation of a security status, causing an interface to be presented, receiving a user input through the interface, and performing one or more actions associated with an IoT device, as described above in connection with FIGS. 1-3 and 5.

Communication network 610 can be any suitable combination of one or more wired and/or wireless networks in some embodiments. For example, communication network 610 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), BLUETOOTH, BLUETOOTH LE, and/or any other suitable communication network. In some embodiments, IoT devices 614 can be connected by one or more communications links directly to communication network 610 or via router 622. In some embodiments, communication network 610 can be linked via one or more communications links to user device(s) 602 and/or server(s) 612. The communications links can be any communications links suitable for communicating data among user device(s) 602, server(s) 612, IoT device(s) 614, and/or router 622 such as network links, dial-up links, wireless links, hard-wired links, any other suitable communications links, or any suitable combination of such links.

Server(s) 612 can be any suitable server(s) for storing information, data, programs, and/or any other suitable type of content. In some embodiments, server(s) 612 can perform any suitable function(s), such as detecting a field of view, capturing images and/or video of a field of view, detecting an IoT device, detecting and/or receiving motion information, recognizing an IoT device in a captured image and/or frame of video, tracking position(s) of an IoT device in a field of views, determining and/or receiving position information, interrogating an IoT device for status, performing a status check of an IoT device, determining a security status of an IoT device, selecting a graphical representation of a security status, causing an interface to be presented, receiving a user input through the interface, and performing one or more actions associated with an IoT device, as described above in connection with FIGS. 1-3 and 5.

IoT devices 614 can include any one or more IoT devices. For example, in some embodiments, IoT devices 614 can include devices such as smart thermostats, smart home devices (e.g., an alarm clock, an electric toothbrush, a scale, a VoIP phone, and/or any other suitable home device), smart vending machines, smart exercise machines, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), smart computing devices (e.g., a mobile phone, a printer, a computer, a network router, such as router 622, and/or any other suitable computing device), smart security systems, and/or any other suitable device capable of connecting to a network to transmit and receive data. In some embodiments, IoT device(s) 614 can perform any suitable function(s), such as handshaking with device(s) 602 and/or 612, receiving a request for status, performing a status self-check, transmitting information indicating a state, performing one or more actions associated with its security status, and/or performing one or more actions associated with a security status of another IoT device, as described above in connection with FIGS. 1-3 and 5.

Although user devices 604, 606, and 608 and server(s) 612 are each illustrated as one device, the functions performed by device(s) 604, 606, 608, and 612 can be performed using any suitable number of devices in some embodiments. For example, in some embodiments, multiple devices can be used to implement the functions performed by each device(s) 604, 606, 608, and 612.

Although three IoT devices 616, 618, and 620 are shown in FIG. 6 to avoid over-complicating the figure, any suitable number of IoT devices, and/or any suitable types of IoT devices, can be used in some embodiments.

User device(s) 602, server(s) 612, IoT device(s) 614, and router 622 can be implemented using any suitable hardware in some embodiments. For example, in some embodiments, devices 602, 612, 614, and 620 can be implemented using any suitable general-purpose computer or special-purpose computer. For example, a smart appliance may be implemented using a special-purpose computer. Any such general-purpose computer or special-purpose computer can include any suitable hardware. For example, as illustrated in example hardware 700 of FIG. 7, such hardware can include hardware processor 702, memory and/or storage 704, an input device controller 7, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 702 can be controlled by a server program stored in memory and/or storage of a server, such as server(s) 612. For example, in some embodiments, the server program can cause hardware processor 702 to detect a field of view, capture images and/or video of a field of view, detect an IoT device, detect and/or receive motion information, recognize an IoT device in a captured image and/or frame of video, track position(s) of an IoT device in a field of views, determine and/or receive position information, interrogate an IoT device for status, perform a status check of an IoT device, determine a security status of an IoT device, select a graphical representation of a security status, cause an interface to be presented, receive a user input through the interface, and perform one or more actions associated with an IoT device. In some embodiments, hardware processor 702 can be controlled by a program stored in memory and/or storage of a user device, such as user device(s) 602. For example, in some embodiments, the program can cause hardware processor 702 to detect a field of view, capture images and/or video of a field of view, detect an IoT device, detect and/or receive motion information, recognize an IoT device in a captured image and/or frame of video, track position(s) of an IoT device in a field of views, determine and/or receive position information, interrogate an IoT device for status, perform a status check of an IoT device, determine a security status of an IoT device, select a graphical representation of a security status, cause an interface to be presented, receive a user input through the interface, and perform one or more actions associated with an IoT device, as described above in connection with FIGS. 1-3 and 5. In some embodiments, hardware processor 702 can be controlled by a program stored in memory and/or storage of an IoT device, such as IoT device(s) 614 and/or router 622. For example, in some embodiments, the program can cause hardware processor 702 to handshake with user device(s) 602 and/or server(s) 612, receive a request for status, perform a status self-check, transmit information indicating a state, perform one or more actions associated with its security status, perform one or more actions associated with a security status of another IoT device, and/or perform any other suitable functions.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 806 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks (e.g., communication network 710). For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 710) in some embodiments. In some embodiments, antenna 816 can be omitted.

Bus 718 can be any suitable mechanism for communicating between two or more components 702, 704, 706, 710, and 714 in some embodiments.

Any other suitable components can be included in hardware 800 in accordance with some embodiments.

In some embodiments, at least some of the above described blocks of the processes of FIGS. 1-3 and 5 can be executed or performed in any order or sequence not limited to the order and sequence shown in and described in connection with the figures. Also, some of the above blocks of FIGS. 1-3 and 5 can be executed or performed substantially simultaneously where appropriate or in parallel to reduce latency and processing times. Additionally or alternatively, some of the above described blocks of the processes of FIGS. 1-3 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for indicating a security status of an IoT device are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for indicating a security status of an Internet of Things (IoT) device, the method comprising:
   capturing real-time video of an IoT device and at least one other item;
   interrogating the IoT device for a status thereof;
   determining a security status of the IoT device based on the interrogating; and
   causing an interface to be presented that displays the real-time video of the IoT device and the at least one other item with an indication of the determined security status of the IoT device overlaid on the real-time video of the IoT device.

2. The method of claim 1, wherein interrogating the IoT device comprises:
   transmitting, to the IoT device, a request for the status thereof; and
   receiving, from the IoT device, information indicating that the IoT device is in a secure state or information indicating that the IoT device is in an insecure state.

3. The method of claim 2,
   wherein the information indicating that the IoT device is in the secure state comprises information indicating that a cryptographic hash of code of the IoT device matches a reference, and
   wherein the information indicating that the IoT device is in the insecure state comprises information indicating that the cryptographic hash of the code of the IoT device does not match the reference.

4. The method of claim 1, further comprising:
   selecting a graphical representation of a plurality of graphical representations based on the determined security status of the IoT device as the indication of the determined security status of the IoT device,
   wherein the plurality of graphical representations comprises a first graphical representation indicating that the IoT device is in a secure state, a second graphical representation indicating that the IoT device is in an insecure state, and a third graphical representation indicating an inability to determine the security status of the IoT device.

5. The method of claim 1, further comprising:
   continuously tracking a position of the IoT device in the real-time video; and
   continuously updating the interface to display the indication of the determined security status of the IoT device relative to the position of the IoT device relative to the real-time video.

6. The method of claim 1, wherein detecting the real-time video is performed using smart glasses.

7. A system for indicating a security status of an Internet of Things (IoT) device, the system comprising:
   a memory; and
   a hardware processor that is couple to the memory and that is configured to:
   capture real-time video of an IoT device and at least one other item;
   interrogate the IoT device for a status thereof;
   determine a security status of the IoT device based on the interrogating; and
   cause an interface to be presented that displays the real-time video of the IoT device and the at least one other item with an indication of the determined security status of the IoT device overlaid on the real-time video of the IoT device.

8. The system of claim 7, wherein the hardware processor is further configured to:
- transmit, to the IoT device, a request for the status thereof; and
- receive, from the IoT device, information indicating that the IoT device is in a secure state or information indicating that the IoT device is in an insecure state.

9. The system of claim 8,
- wherein the information indicating that the IoT device is in the secure state comprises information indicating that a cryptographic hash of code of the IoT device matches a reference, and
- wherein the information indicating that the IoT device is in the insecure state comprises information indicating that the cryptographic hash of the code of the IoT device does not match the reference.

10. The system of claim 7, wherein the hardware processor is further configured to:
- select a graphical representation of a plurality of graphical representations based on the determined security status of the IoT device as the indication of the determined security status of the IoT device,
- wherein the plurality of graphical representations comprises a first graphical representation indicating that the IoT device is in a secure state, a second graphical representation indicating that the IoT device is in an insecure state, and a third graphical representation indicating an inability to determine the security status of the IoT device.

11. The system of claim 7, wherein the hardware processor is further configured to:
- continuously track a position of the IoT device in the real-time video; and
- continuously update the interface to display the indication of the determined security status of the IoT device relative to the position of the IoT device relative to the real-time video.

12. The system of claim 7, wherein the hardware processor is part of a pair of smart glasses.

13. A non-transitory computer-readable medium containing computer-executable instructions that, when executed by a processor, cause the processor to perform a method for indicating a security status of an Internet of Things (IoT) device, the method comprising:
- capturing real-time video of an IoT device and at least one other item;
- interrogating the IoT device for a status thereof;
- determining a security status of the IoT device based on the interrogating; and
- causing an interface to be presented that displays the real-time video of the IoT device and the at least one other item with an indication of the determined security status of the IoT device overlaid on the real-time video of the IoT device.

14. The non-transitory computer-readable medium of claim 13, wherein interrogating the IoT device comprises:
- transmitting, to the IoT device, a request for the status thereof and
- receiving, from the IoT device, information indicating that the IoT device is in a secure state or information indicating that the IoT device is in an insecure state.

15. The non-transitory computer-readable medium of claim 14,
- wherein the information indicating that the IoT device is in the secure state comprises information indicating that a cryptographic hash of code of the IoT device matches a reference, and
- wherein the information indicating that the IoT device is in the insecure state comprises information indicating that the cryptographic hash of the code of the IoT device does not match the reference.

16. The non-transitory computer-readable medium of claim 13, wherein the method further comprises:
- selecting a graphical representation of a plurality of graphical representations based on the determined security status of the IoT device as the indication of the determined security status of the IoT device,
- wherein the plurality of graphical representations comprises a first graphical representation indicating that the IoT device is in a secure state, a second graphical representation indicating that the IoT device is in an insecure state, and a third graphical representation indicating an inability to determine the security status of the IoT device.

17. The non-transitory computer-readable medium of claim 13, the method further comprising:
- continuously tracking the position of the IoT device in the real-time video; and
- continuously updating the interface that displays the indication of the determined security status of the IoT device relative to the position of the IoT device relative to the real-time video.

18. The non-transitory computer-readable medium of claim 13, wherein detecting the real-time video is performed using smart glasses.

* * * * *